United States Patent [19]

Kinoshita et al.

[11] 4,087,854

[45] May 2, 1978

[54] MINICOMPUTER SYSTEM WITH AN ARITHMETIC CONTROL UNIT INTEGRATED ON A ONE-CHIP SEMICONDUCTOR DEVICE

[75] Inventors: Tsuneo Kinoshita, Kokunbunji; Kazuyuki Sato, Koganei, both of Japan

[73] Assignee: Tokyo Shibaura Electric Co., Ltd., Japan

[21] Appl. No.: 719,052

[22] Filed: Aug. 30, 1976

[30] Foreign Application Priority Data

| Sep. 4, 1975 | Japan | 50/107261 |
| Sep. 4, 1975 | Japan | 50/107262 |
| Sep. 4, 1975 | Japan | 50/107263 |
| Sep. 4, 1975 | Japan | 50/107264 |
| Sep. 4, 1975 | Japan | 50/107265 |
| Sep. 4, 1975 | Japan | 50/107266 |
| Sep. 4, 1975 | Japan | 50/107267 |
| Sep. 4, 1975 | Japan | 50/107268 |
| Sep. 4, 1975 | Japan | 50/107268 |
| Sep. 4, 1975 | Japan | 50/107269 |
| Sep. 4, 1975 | Japan | 50/107270 |

[51] Int. Cl.$^2$ .................... G06F 7/48; G06F 13/00
[52] U.S. Cl. .................................. 364/200
[58] Field of Search ............... 340/172.5; 445/1; 364/200, 900

[56] References Cited

U.S. PATENT DOCUMENTS

| 3,702,988 | 11/1972 | Haney et al. | 340/172.5 |
| 3,757,306 | 9/1973 | Boone | 340/172.5 |
| 3,757,308 | 9/1973 | Fosdick | 340/172.5 |
| 3,793,631 | 2/1974 | Silverstein et al. | 340/172.5 |
| 3,878,514 | 4/1975 | Faber | 340/172.5 |
| 3,938,098 | 2/1976 | Garlic | 340/172.5 |
| 3,962,682 | 6/1976 | Bennett | 340/172.5 |
| 3,984,813 | 10/1976 | Chung | 340/172.5 |

OTHER PUBLICATIONS

Altman; "Single-chip Microprocessors open up a New World of Applications" in *Electronics*, Apr. 18, 1974, pp. 81-87.

Reyling, Jr.; "Single-chip Microprocessor Employs Minicomputer Word Length" in *Electronics*, Dec. 26, 1974, pp. 87-93.

*Primary Examiner*—Melvin B. Chapnick
*Attorney, Agent, or Firm*—Oblon, Fisher, Spivak, McClelland & Maier

[57] ABSTRACT

A minicomputer system comprising an arithmetic control unit integrated on a one-chip semiconductor device using n-channel silicon gate E/D MOS technology and a control storage separate from and connected to the arithmetic control unit for storing microinstructions. The arithmetic control unit includes two kinds of read only memories, each having a small memory capacity. The first read only memory stores start addresses of specific microinstructions for phase control, an illegal instruction trap and an initialization trap. The second read only memory stores auxiliary microinstructions to handle operations involving an accumulator, general registers and an instruction register in the arithmetic control unit.

10 Claims, 21 Drawing Figures

OP : OPERATIONAL CODE FIELD
D : DESTINATION FIELD
S : SOURCE FIELD
$S_{IX}$ : SOURCE INDEXING FIELD

FIG. 13B (∗) : EXCLUDE STH, BAL, BFC & BTC INSTRUCTIONS
(∗∗) : INCLUDE　"　 "　 "　 "　 "

MINICOMPUTER SYSTEM WITH AN ARITHMETIC CONTROL UNIT INTEGRATED ON A ONE-CHIP SEMICONDUCTOR DEVICE

BACKGROUND OF THE INVENTION

1. Field of the Invention

This invention relates to a minicomputer system and more particularly to an arithmetic control unit integrated on a one-chip semiconductor device.

2. Description of the Prior Art

The present development of semiconductor process technology has brought forth a LSI of 5000 gates at maximum on a one-chip semiconductor (MOS) device. However, it is sufficient to provide a microprocessor including functions of 8-bit or at most 12-bit logic operation for a desk-top type calculator, an industrial controller with simplified construction and the like. A restriction results from the number of pins or output terminals led out of the one-chip semiconductor device and the chip size thereof. This causes communication channels with utilization devices and a capability of a logic unit, for example, register bit-lengths, to be restricted. This in turn causes the number of functional elements contained in the microprocessor to be restricted. Therefore, it is difficult for the microprocessor integrated on a one-chip semiconductor device to have substantially the same performance as the processor of a conventional mini-computer.

SUMMARY OF THE INVENTION

It is one object of the invention microinstruction provide a new and improved unique data processing system with a microprocessor including an arithmetic control unit integrated on a one-chip semiconductor device.

It is another object of the invention to provide a microprocessor including an arithmetic control unit integrated on a one-chip semiconductor device having substantially the same performance as the processor of a conventional mini-computer.

It is a further object of the invention to provide a microprocessor having soft-ware compatibility with a conventional mini-computer.

The foregoing and other objects are attained in accordance with one aspect of the invention by providing an arithmetic control unit integrated on a one-chip semiconductor device which includes a first read only memory for storing addresses of specific microinstructions for phase control and for handling at least illegal instructions and initialization of the microprocessor, a second read only memory for storing auxiliary microinstructions, and an internal common bus for transmitting information throughout the arithmetic control unit.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

The preferred embodiment of the data processing system in accordance with the invention includes a main memory with 16 bits/one word and a multiplexer bus with 8 bits.

1. Configuration of the System

Figure 1:
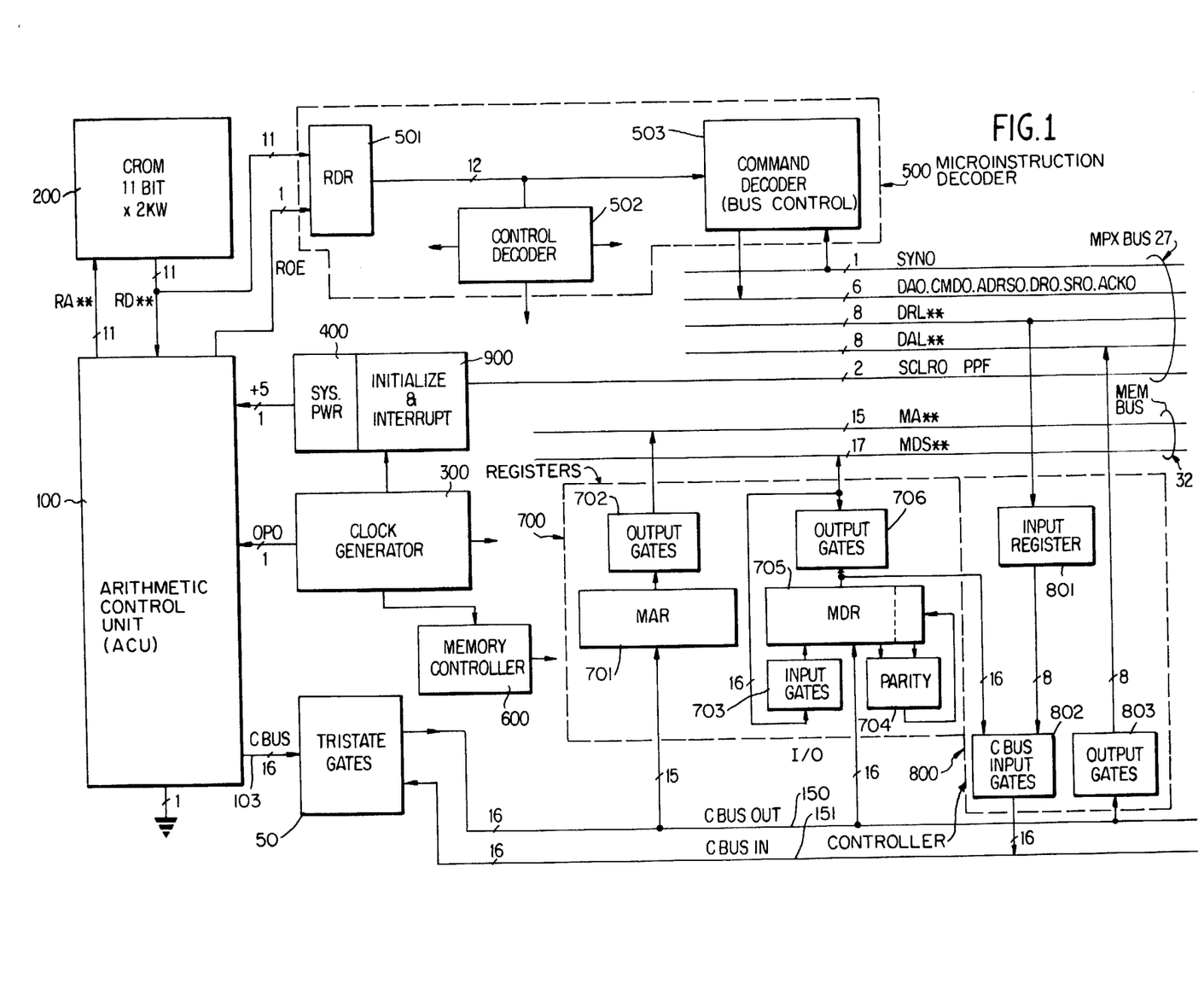
FIG. 1 shows a schematic block diagram of a data processing system adapted to implement the invention.

The system comprises the following fundamental elements as shown in FIG. 1; an arithmetic control unit (ACU) 100, a control storage or read only memory (CROM) 200, a clock pulse generator 300, a system power source 400, a microinstruction decoder 500, a main memory controller 600, a memory address register/memory data register 700, an input/output controller 800, an interrupt/initialize circuit 900, and connecting busses. A standard data processing system further includes (not shown in FIG. 1) a main memory, I/O (input/output) devices, an operator console, and the like, as understood by those skilled in the art.

2. Arithmetic Control Unit

Figure 2:
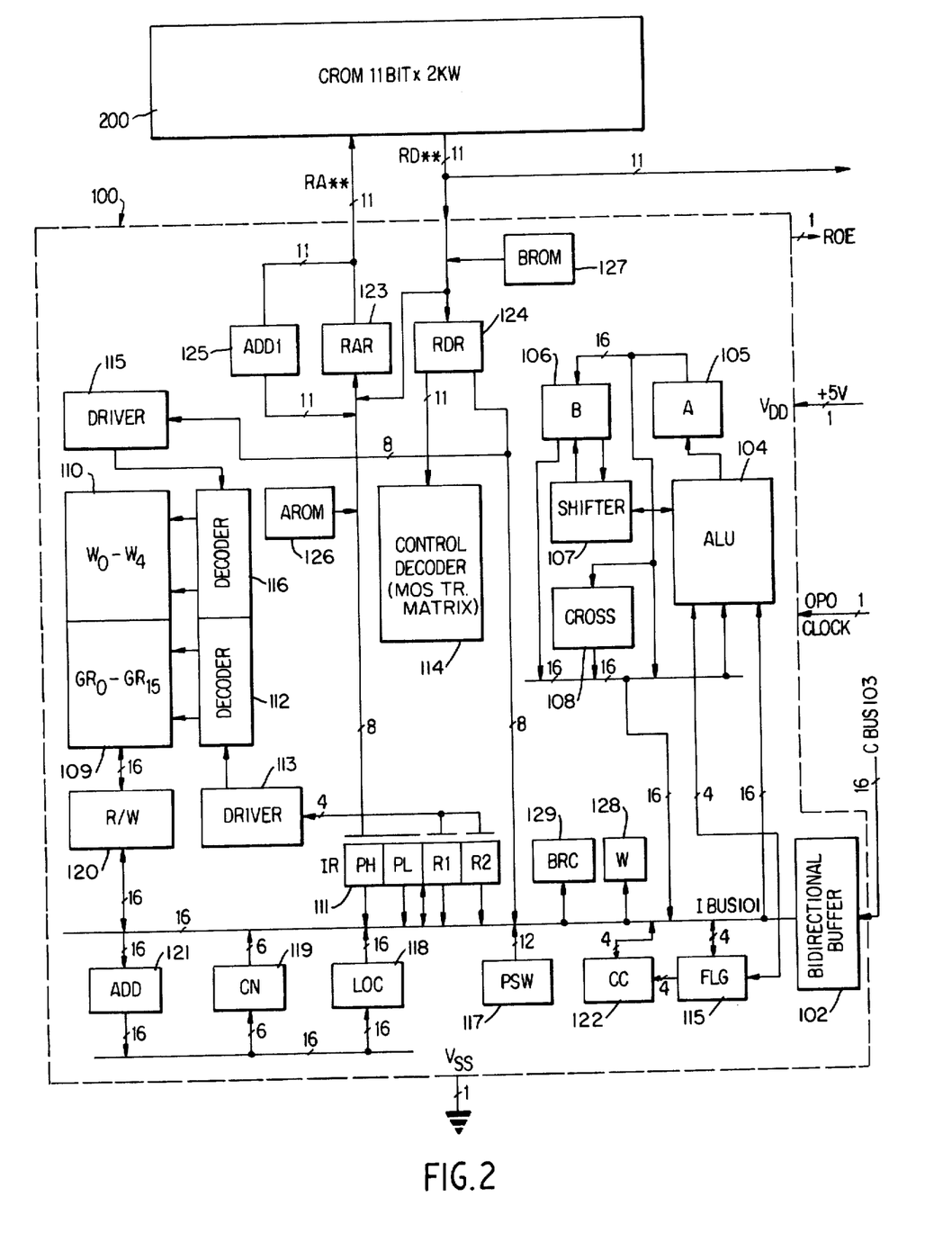
FIG. 2 shows a block diagram of an embodiment of the arithmetic control unit shown in FIG. 1.
Figure 3:
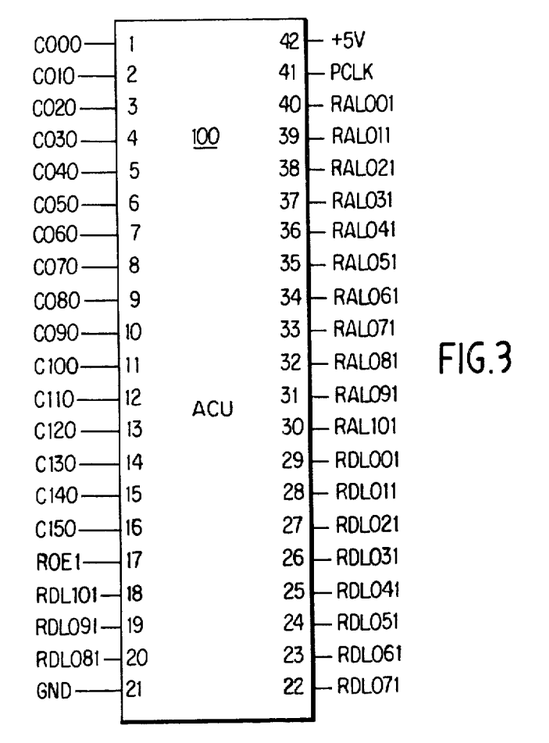
FIG. 3 illustrates a pin arrangement of the one-chip semiconductor device shown in FIG. 1.

A block diagram of the arithmetic control unit (ACU) 100 is illustrated in FIG. 2. The ACU 100 is integrated on a one-chip semiconductor device by applying n-channel silicon gate E/D MOS technology thereto, and a pin arrangement thereof is also shown in FIG. 3. A large scale integrated circuit (LSI) of the ACU 100 comprises the following elements:

(1) Common Busses

The common bus which is produced on the semiconductor device 100 is designated as an internal bus (I-BUS) 101. Another common bus which is connected with the I-BUS 101 through a bidirectional buffer and is led out of the semiconductor device 100 is designated as a common bus (C-BUS) 103. The I-BUS 101 and C-BUS 103 are bidirectional busses with 16 bits. Almost all control information signals in the ACU 100 are passed through the I-BUS 101, while all information signals are transferred between the ACU, 100 and multiplexer bus 27 and memory bus through the bidirectional buffer 102 the C-BUS tri-state gates 50, I/O controller 800 and registers 700, respectively.

(2) Arithmetic & Logic Unit

The arithmetic and logic unit 104 is a logic block which conducts parallel add/subtract operations with 16-bit data, logical operations and bit shift operations.

One of two inputs with 16-bit data or operands is supplied from an output of an A-register (AR) 105 or a B-register (BR) 106 to the ALU 104, and another input is supplied from the I-BUS 101. Outputs of the ALU 104 are always entered into the A-register 105. A shift register (SHIFTER) 107 is connected between the B-register 106 and the ALU 104 and contributes to the shift operations in the ALU 104. The contents of the A-register 105 may be swapped by means of a cross shift logic circuit (CROSS) 108.

The ALU 104 is accompanied with a flag register (FLG) 115 in order that the contents of the FLG 115 are changed in accordance with a result of operation of the ALU 104 and they contribute to the operations.

(3) The A-register and the B-register

The A-register (AR) 105 and the B-register (BR) 106 function as an accumulator and as an auxiliary extended or quotient register, respectively, both of which comprise 16-bit registers.

The ALU 104 receives data from the I-BUS 101 and the A-register 105, as the first and the second operands respectively and then the result of the arithmetic operation is stored in the A-register 105. Data on the I-BUS 101 are the contents of the source register which is designated by a microinstruction. (In a case where the result is stored in a register other than the A-register 105, the contents of the other register are supplied to the I-BUS 101.)

The B-register 106 includes the additional function of temporarily storing the contents of the A-register 105.

Almost all microinstructions relate to the manipulation of the A-register 105 or the B-register 106 and the operands thereof are supplied to one input of the ALU 104.

(4) General Registers and Working Registers

The general registers (GR) 109 and the working registers (WR) 110 comprise a plurality of 16-bit registers respectively, in which the GR 109 and the WR 110 comprise respectively 16 addressed registers (GR 0-BR-15) designated by macroinstructions and 5 addressed registers (WR0-WR4) utilized by microinstructions through a driver 115 and a decoder 116.

The GR 109 are selected by operands or R1 or R2 parts in an instruction register (IR) 111 as hereinafter described.

When the GR 109 are accessed by microinstructions, they are indirectly designated. Thus, when YD (User's Destination) and YS (User's Source) are designated by microinstructions, the contents of R1 and R2 are respectively sent to a decoder of the GR 109 through a driver 113 and the GR 109 are selected in response to signals decoded by the internal control decoder 114.

However, when YDPI (YD Plus One) is designated by microinstruction, the contents of RI are available for selection of the GR 109 if they comprise an even number, while YDP1 has the same effect as the designation YD if the contents of R1 comprise an odd number. The contents of the GR 109 are read and written through a read/write circuit (R/W) 120.

(5) Instruction Register

The instruction register (IR) 111 is a 16-bit register which comprises an operation part with an operation code high field (PH), an operation code low field (PL) and a modifier field with a R1 field and a R2 field.

Full fields and each field of the IR can be designated respectively. When the IR is designated, 16-bit (bit positions 0-15) information of the I-BUS 101 are transferred from or to IR 111. However, when each field (R1, R2, PH, or PL) is designated, 4-bit (bit positions 12-15) information on the I-BUS 101 are transferred from or to the IR 111.

(6) Program Status Word Register

The program status word register (PSW) 117 is a 12-bit register which stores control information with a microinstruction level. The function of each bit position is defined as follows:

Table 1

| Bit Position | Symbol | Function |
|---|---|---|
| 0 | WT | If this bit is ON, a condition of CPU-WAIT is indicated. |
| 1 | EI | A mask interrupts from the peripheral devices. If it is ON, interrupts are allowable. |
| 2 | MM | A mask of CPU abnormal interrupts. If it is ON, the interrupts are allowable. |
| 3 | DF | A mask of interrupts of errors on divisional operations. If it is ON, the interrupts are allowable. |
| 4 | AS | If EI AS is ON, automatic I/O services are executed. |
| 5 | FP | A mask of interrupts of errors on floating point operations. If it is ON, the interrupts are accepted. |
| 7 | PM | A mask of interrupts on illegal memory protection. If it is ON, the interrupts are accepted. |
| 8-11 | φ | Not used. |

(7) Location Counter, Counter Register and Add-Counter

The location counter (LOC) 118 and the counter register (CN) 119 are respectively a 16-bit register and a 6-bit register. The LOC 118 contains the address of the next macroinstruction to be executed. The CN 119 counts the number of shifts during the shift operation and the contents thereof are added by 1 in a shift. The LOC 118 partially shares the logic circuits with the CN 119. An add-counter (ADD) 121 comprises a 16-bit register used for adding to the contents of the LOC 118.

(8) Condition Code Register, Flag Register

The condition code register (CC) 122 is a 4-bit register which holds machine control information of the macroinstruction level. The flag register (FLG) 115 comprises a 4-bit register which holds the machine control information of microinstruction level, and each bit therein contains the meanings as shown in the following Table 2.

Table 2

| Bit Position | Symbol | Meaning |
|---|---|---|
| 0 | C | Carry bit |
| 1 | V | Overflow bit |
| 2 | G | Greater bit |
| 3 | L | Lower bit |

The contents of the FLG 115 are stored in the CC 122 after executing one microinstruction in a series of microinstructions.

(9) ROM Address Register

The ROM address register (RAR) 123 comprises an 11-bit register which holds the address of the next microinstruction to be executed. The contents of the RAR are changed for one of the outputs of the CROM 200, an add circuit (ADD 1) 125, which adds "1" to the contents of the RAR 123, an AROM 126, which is described hereinafter, and the upper 8-bit (PH and PL) of the IR 111 under the control of the decoder 114.

(10) ROM Data Register

The ROM data register (RDR) 124 comprises an 11-bit register which holds a microinstruction to be executed.

The address of the CROM is designated by the RAR, and the contents thereof are held in the RDR.

(11) AROM, BROM

The AROM 126 and BROM 127 are read only memories which have the capacity of 5 words (11 bits/one word) respectively.

The AROM 126 stores the specific start addresses of the CROM 200 as follows:

Table 3

| Address of AROM | Start Address of CROM stored in AROM |
|---|---|
| 0 | Start address of illegal instructions trap |
| 1 | Start address of initialization trap |
| 2 | Start address for phase 0 |
| 3 | Start address for phase 1 |
| 4 | Start address for phase 2 |

The BROM 127 stores auxiliary instructions for execution of the BRANCH instruction and the like as follows:

Table 4

| Address of BROM | Auxiliary microinstruction stored in the BROM ("Assembler" Expression) |
|---|---|
| 0 | Instruction for giving a result to a destination register in the GR. ("G..., YD") |
| 1 | Instruction for clearing the contents of the A-register. ("LB., NULL") |
| 2 | Instruction for loading the contents of a source register in the GR to the A-register. ("L..., YS") |
| 3 | Instruction for loading the masked contents of the R2 to the A-register. ("L,M, R2") |
| 4 | No-operation ("CN") |

(12) W flip-flop

The W flip-flop 128 stores the least significant bit on the C-BUS 103 when the 16-bit address is transmitted from the ACU 100 to the MAR 701.

At the execution of the microinstruction "CW" (Exchange by W), the exchange is determined in accordance with the contents of the W flip-flop 128.

(13) Branch Control Flip-Flop

The branch control flip-flop 129 is a circuit which executes the branch operation in response to the contents of the last 6-bit or 4-bit information on the I-BUS 101 at the branch operations of BRANCH, TEST, JUMP and SHIFT.

(14) ROM Output Effective Terminal

A control signal for the microinstruction decoder 500 is derived from the ROM output effective (ROE) terminal. This signal is provided from the control decoder 114 in the ACU 100 and it is used for the decoder 500 to examine whether it is effective or not.

The decoder 500 comprises a ROM data register (RDR) 501 which is substantially the same as the RDR 124 in the ACU 100 except the operation thereof is controlled by the ROE signal, a control decoder 502 having the same function and configuration of the control decoder 114 in the ACU 100 and a command decoder 503 which functions as a bus controller for the multiplexer (MPX) bus 27. When the ROE signal is "low" level, the decoder 500 is not enabled. However, when the ROE signal is "high" level, the decoder 500 is enabled so that microinstructions stored in the RDR 501 are decoded in the control decoder 502 under the same manner of the control decoder 114 in the ACU 100. The microinstructions include control information for the commands shown in Table 5, hereinafter described. Therefore, the control information is decoded in the command decoder 503 to be supplied to the MPX bus 27.

(15) Control Decoder

The control decoder 114 in the ACU 100 decodes the microinstruction so as to provide various registers with control signals. The decoder 114 comprises a MOS transistor matrix and control lines thereof in the ACU 100 are not shown in FIG. 2.

3. Interfaces between the ACU and the Utilization Devices Thereof

There are seven types of paths for connecting the ACU 100 and the devices located outside thereof as shown in FIG. 1;

| 1) C-BUS | 16 bits |
| 2) RD** | 11 bits |
| 3) RA** | 11 bits |
| 4) OPO (CLOCK) | 1 bit |
| 5) POWER (+5V) | 1 bit |
| 6) GND (GROUND) | 1 bit |
| 7) ROE | 1 bit |

Detailed Description of the Interfaces:

(1) C-BUS

Figure 4:
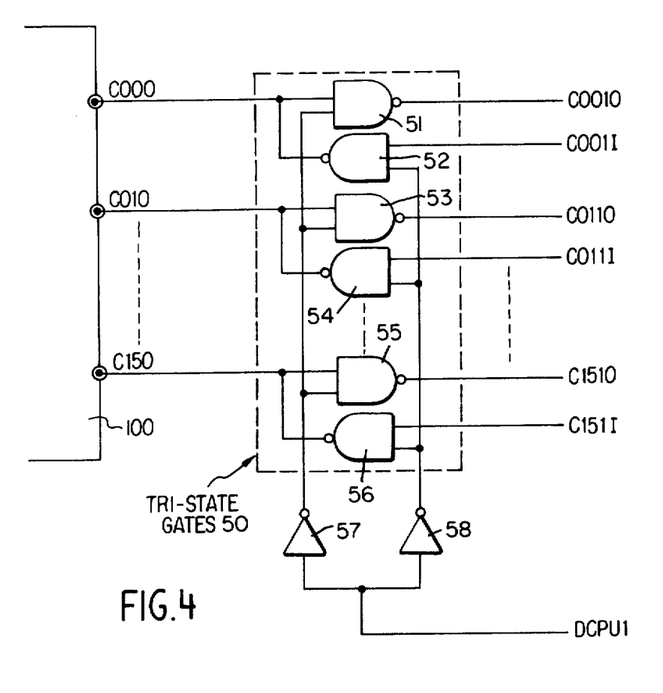
FIG. 4 shows a circuit diagram of the C-BUS interface shown in FIG. 1, FIGS. 5 and 6 show a circuit diagram of the C-BUS and memory bus interfaces shown in FIG. 1.

The C-BUS 103 with 16-bits is a bidirectional bus which is connected with the tristate gates 50 in order to function as a TTL level bus as shown in FIG. 4. The bus (C000–C150) is divided into C-BUS inputs (C*I) and C-BUS outputs (C*0) through tri-state gates 50. The tri-state gates 50 comprise NAND gates 51, 52, 53, 54, 55 and 56 and inverters 57 and 58, which are for switching the C-BUS inputs to the C-BUS outputs and vice versa in response to an access control signal (DCPU1) of "Decode CPU1" to the main memory which is generated after the ACU 100 and DMA channel (not shown) determine access to the main memory.

(2) Main Memory Address Information

Figure 5:
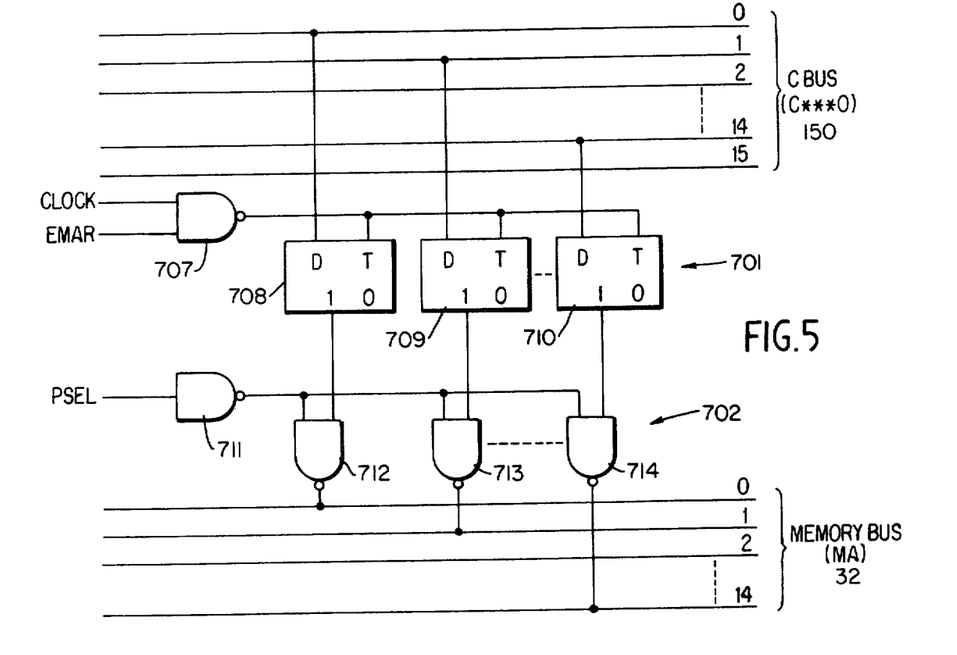

The address information with 15-bits is sent to the memory address register (MAR) 701 through the C-BUS OUT 150. The least significant digit is stored in the W flip-flop 128 in the microprocessor ACU 100 so that higher 15-bit address information is transferred to the MAR 701. The MAR 701 comprises NAND gates 707 and D flip-flop circuits 708, 709 and 710 and output gates 702 comprise NAND gates 711, 712, 713 and 714 as shown in FIG. 5 wherein 15 flip-flop circuits store the information on the C-BUS OUT 150 in response to signals of "CLOCK" and "EMAR" (Enable MAR). The "EMAR" signal is "ON" when the MAR 701 is selected as a destination register by microinstruction on the semiconductor device ACU 100. The "PSEL" signal is "ON" when the ACU 100, not the DMA channel, is selected and thereafter communications between the memory bus 32 and the MAR 701 are available.

(3) Memory Data Information

Figure 6:
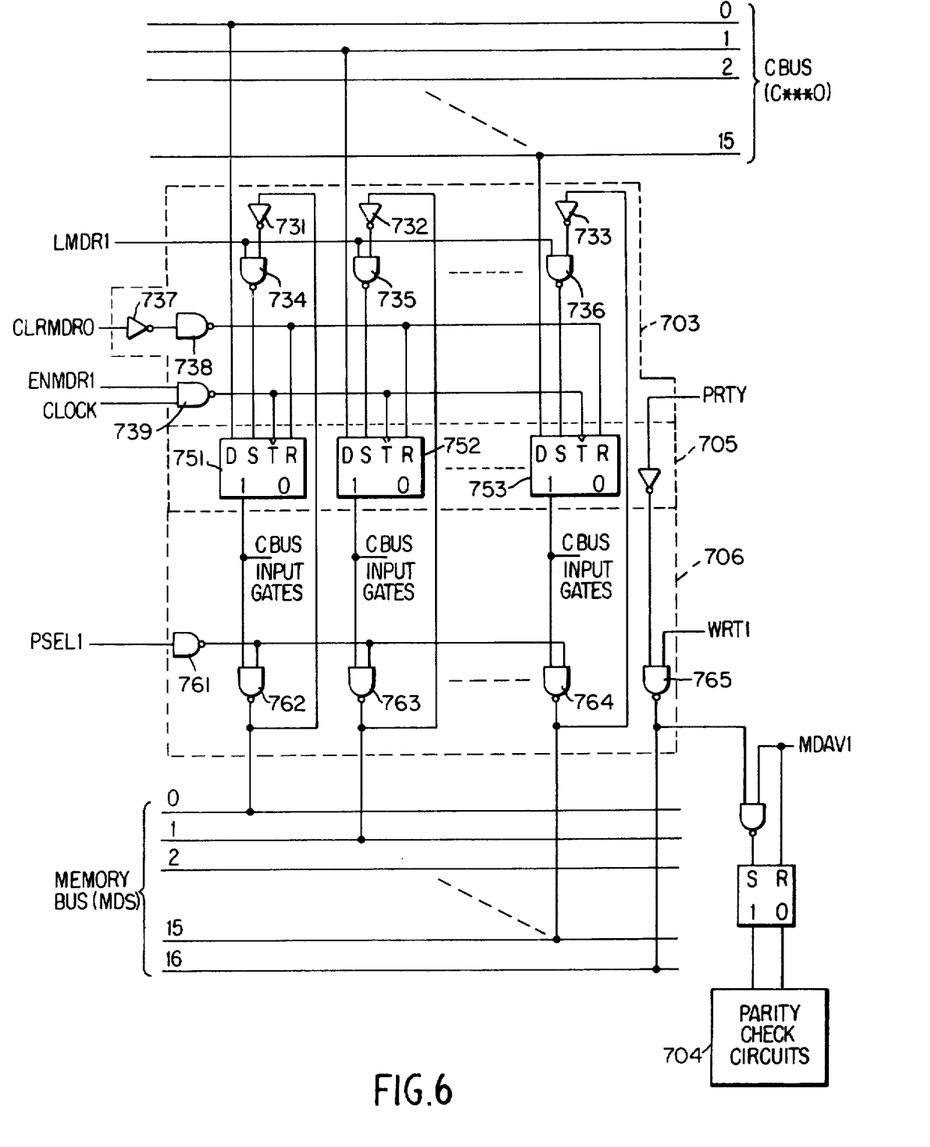

Data transferred from the main memory are latched in memory data register (MDR) 705. The memory data information comprises 17-bits including parity information. The MDR 705 and interfaces including the C-BUS OUT 150 and parity check circuits 706 are shown in FIG. 6. Input gates 703 comprise inverters 731, 732 and 733 with which output gates 706 are connected, NAND gates 734, 735, 736, 738 and 739, and an inverter 737. The MDR 705 comprises SRT type flip-flops 751, 752 and 753, the outputs of which are connected to C-BUS input gates 802, and an inverter 705 to which the parity check signal is supplied. The output gates 706 comprise NAND gates 761, 762, 763, 764 and 765. In FIG. 6 the control signals, which are generated in the memory controller 600 have the following meanings:

The "PSEL1" signal is "ON" when the ACU 100, not the DMA channel, has main memory access.

The "ENMDR1" signal is "ON" when the MDR 705 is selected as a source register by the microinstructions.

The "CLRMDRO" signal clears the contents of the MDR 705 when a read-out operation of the main memory is executed.

The "LMD1" signal is "ON" when the microinstruction which loads the MDR 705 with data from the main memory is issued.

Therefore, data are written in the main memory when the following conditions are established;
PSEL 1=ON, ENMDR 1 & CLOCK=ON, CLRMDRO=OFF, and LMDR 1=OFF.

On the other hand, data are read out from the main memory when the following conditions are established; first of all CLRMDRO=OFF, then PSEL1=ON, ENMDR1 & CLOCK=OFF, and LMED1=ON.

Parity signals of "PRTY" in the memory data are generated at the processor 100 memory controller 600.

Figure 7:
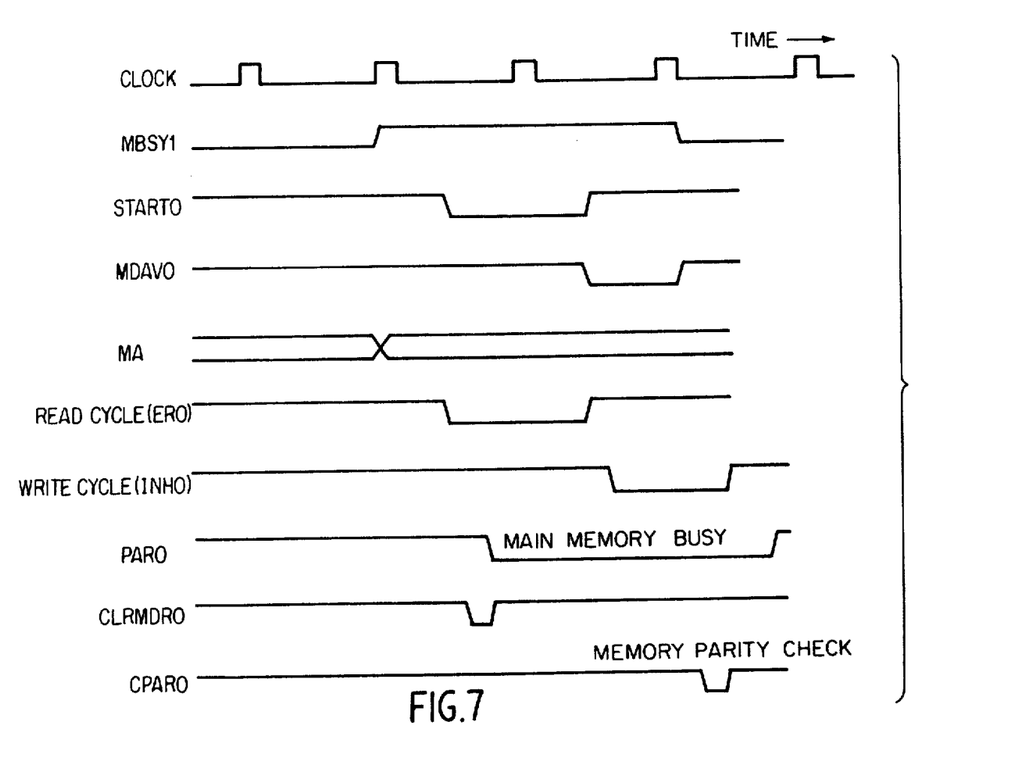
FIG. 7 shows a waveform diagram for the circuit shown in FIG. 6, FIGS. 8 and 9 show a circuit diagram of the C-BUS and MPX BUS interfaces shown in FIG. 1.

When the main memory is subjected to the writing condition, namely the "WRT1" signal is "ON" and AND conditions with the memory available signal of "MDAV1" are established, the parity check circuits are operated. The timing chart of the above mentioned operations is shown in FIG. 7 wherein each signal is defined as follows:

MBSY1; A signal produced in the ACU 100 representing a memory request condition.

START0; A signal produced in the ACU 100 representing the start of the main memory operation.

MDAV0; A signal produced in the main memory representing that data are transferred from the main memory to the memory bus after having been read out.

PAR0; A signal produced in the main memory representing that the main memory is busy in the memory cycle.

CPAR0; A signal produced in the microprocessor representing a timing signal to start the memory parity check.

MA; An output of the MAR.

(4) Interrupts

In the data processing system, the following events can be accepted as external interrupts;
ATN; Interrupt for service requests from the I/O devices.
CATN; Interrupts for service requests from the console switches.
SINGL; Requests for execution of a single step mode.
PPF; Interrupts of primary power failure.
MPE; Interrupts of memory parity error.

These five types of signals are partially AND-operated with an interrupt mask field of PSW, namely PSW (01), PSW (02), to produce interrupt signals of "ITR". The "ITR" signals are as follows:

$$ITR = PSW(01) \cdot ATN + CATN + SNGL + PPF + PSW(02) \cdot MPE$$

The "ITR" signals are supplied to the ACU 100 through the least significant bit of the C-BUS in response to a predetermined micro-instruction which is issued at the last timing of a microinstruction interpretation/execution cycle (Phase 2). If there are any interrupts, the control sequence is switched to the execution cycle of the interrupt sequence (Phase 3) instead of to a microinstruction fetch cycle.

(5) Detection of Interrupts

Six kinds of external interrupts including an automatic restart ("ASRT" signal) in addition to the above-identified interrupts can be detected in this data processing system.

The detection is conducted in response to a predetermined microinstruction.

When this microinstruction is executed, signals of external interrupts are introduced into the ACU 100 through the following bit-positions in the C-BUS.
C 100; ATN (Attention)
C 110; CATN (Console Attention)
C 120; SNGL (Single Step Mode)
C 130; ARST (Automatic Restart)
C 140; PPF (Primary Power Failure)
C 150; MPE (Memory Parity Error)

Then, detection/neglection of the external interrupts are identified in accordance with "ON/OFF" of mask-bits in the PSW register. After detection of the interrupts, branch operation toward the predetermined address of CROM 200 is initiated.

(6) Communication with I/O devices.

Microinstructions controlling the communication with I/O devices are shown in Table 5 where commands mean instructions to establish operation modes of I/O devices.

Table 5

| Microinstruction | Function |
| --- | --- |
| E DAO | Output data with 8-bits to I/O devices |
| E CMD | Send commands to I/O devices |
| E ADRS | Send an address to I/O devices |
| E DAI | Input data with 8-bits to the microprocessor |
| E STA | Read status-data with 8-bits of I/O devices |
| E ACK | Read an address of I/O devices requesting for services. |

Figure 8:
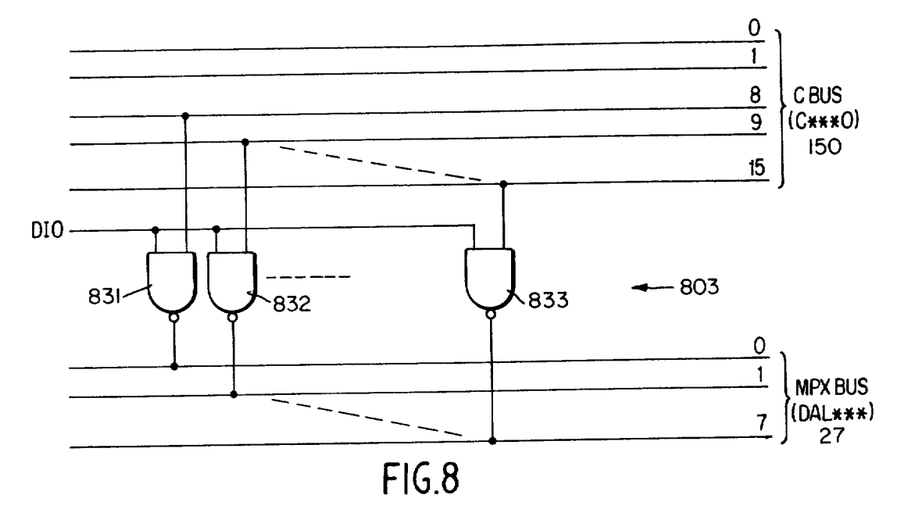
Figure 9:
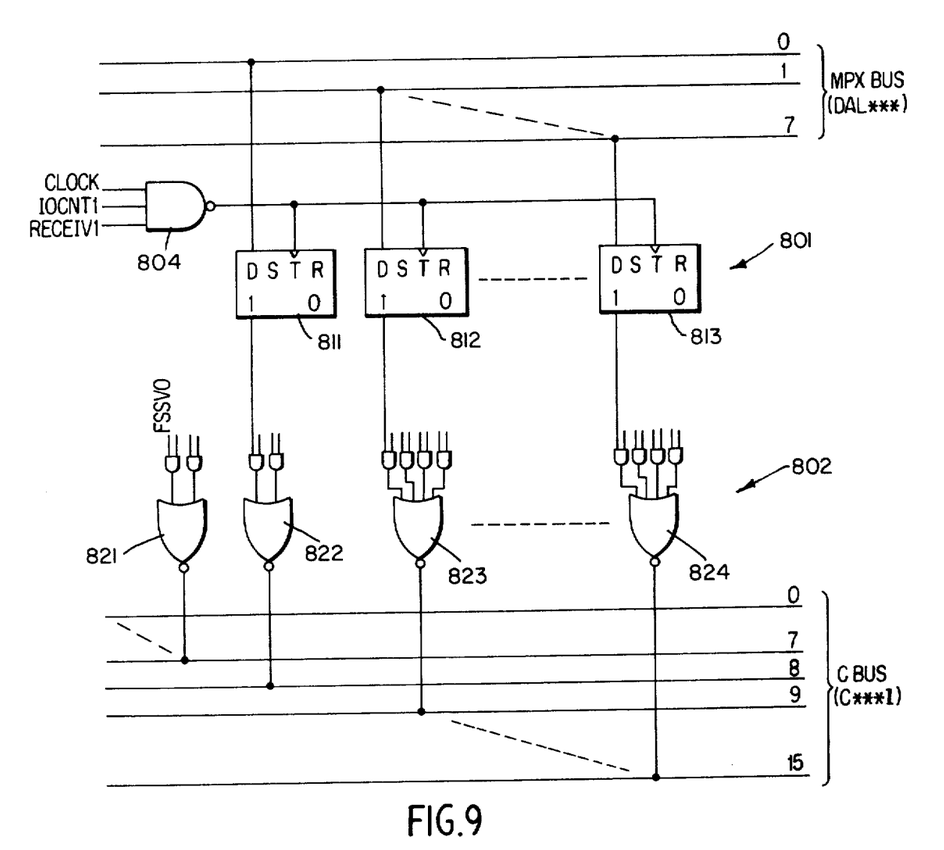

The communication of the ACU 100 with the I/O devices is conducted through the C-BUS and the MPX- BUS. Logic circuits 803 of NAND gates 831, 832 and 833 for output from the C-BUS to the MPX-BUS as shown in FIG. 8 wherein a signal "DIO" (destination signal) is "ON" at the issue of the signals DAO, CMP and ADRS. Logic circuits for inputs from the MPX-BUS to the C-BUS are shown in FIG. 9, wherein the logic circuits comprise the input register 801 of D flip-flop circuits 811, 812 and 813, NAND gate 804, and the input gates 802 of NOR gates 821, 822, 823 and 824. A signal "IOCNT1" is a timing signal generated in the I/O controller (not shown) which represents that the I/O controller is sending a control timing signal to the microprocessor ACU 100. A signal "RECEIV1" of NAND gate 804 represents that the ACU 100 has received a synchronizing signal from the I/O devices. The gates 802 shown in FIG. 9 function to select the input/output in response to the microinstruction of Table 5, the input data of MRD 705, the data of the microinstruction for the detection of interrupts, and the interrupt signals. A signal "FSSVO" (False Synchronous Set V-Flag) represents a fault of the I/O devices without response therefrom. This signal is supplied to the ACU 100 through bit 7 (8th bit position) on the C-BUS at the initiation of the microinstructions shown in Table 5 and is stored in the V-bit of the C C register 122.

(7) Control ROM

The sequence of logical operations in the ACU 100 is stored in a control ROM or control storage (CROM) in the form of a microprogram (a set of microinstructions) which is located outside the ACU 100. The CROM 200 is connected with the ACU 100 through the ROM address lines (RAL 000-RAL 100 and the ROM data lines (RD 000-RD 101).

The capacity of the CROM 200 is 2K words (11 bits/one word) in this embodiment, but it can be expanded to 4K words. The CROM 200 comprises, for example, a bipolar ROM with 3×8 chips 201 as shown in FIG. 10 wherein each ROM is 4 bits × 256 words-/one chip and the chip-selection is made through RAL 000-RAL 020 inverters 211, 212, 213 and 214, and NAND gates 215, 216, 217, 218, 219 and 220 while the word-selection in the ROM chip is made through RAL 030-RAL 100 inverters 221, 222 and 223, and NAND gates 224, 225 and 226.

Figure 10:
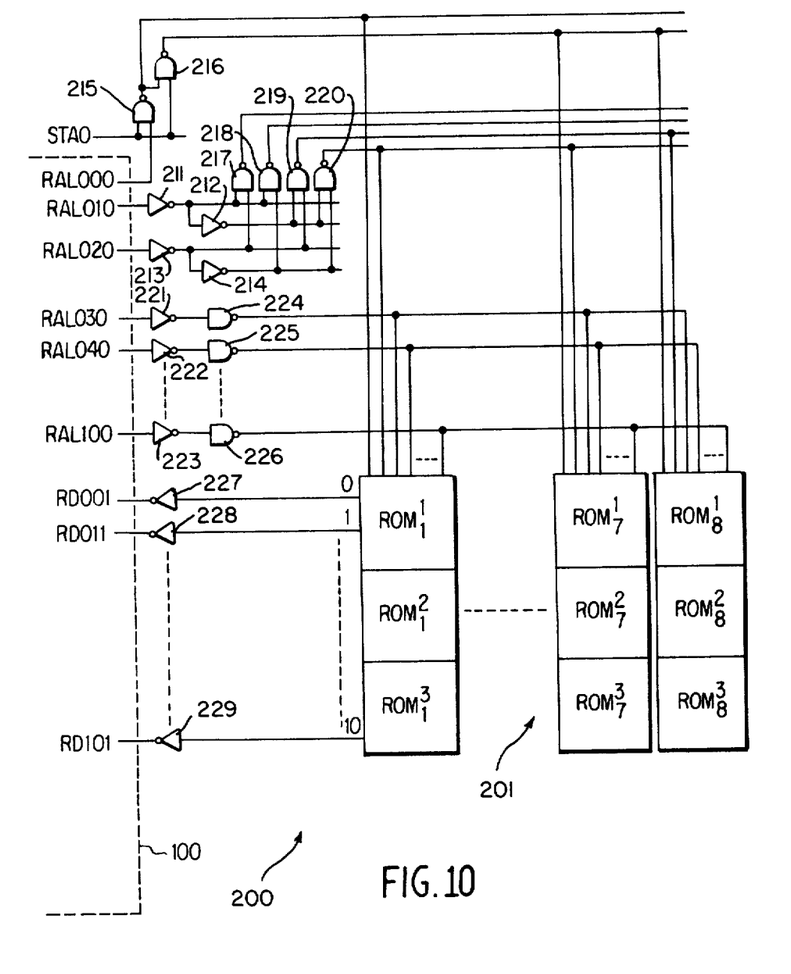
FIG. 10 shows a block diagram of CROM of FIG. 1.

A signal "STAO" shown in FIG. 10 represents a signal for preventing the CROM 200 from issuing the outputs of the ROM DATA. Further, the ACU 100 does not accept any outputs of the CROM during the presence of the "STAO" signal. This signal may be produced by the console, a tester for microsteps of the system or the like. The data read from the CROM 200 are supplied to the ACU through inverters 227, 228 and 229 and RD001-RD101.

(8) Clock pulse Generator

The ACU 100 operates in accordance with the clock pulse signals.

Figures 11A, 11B:
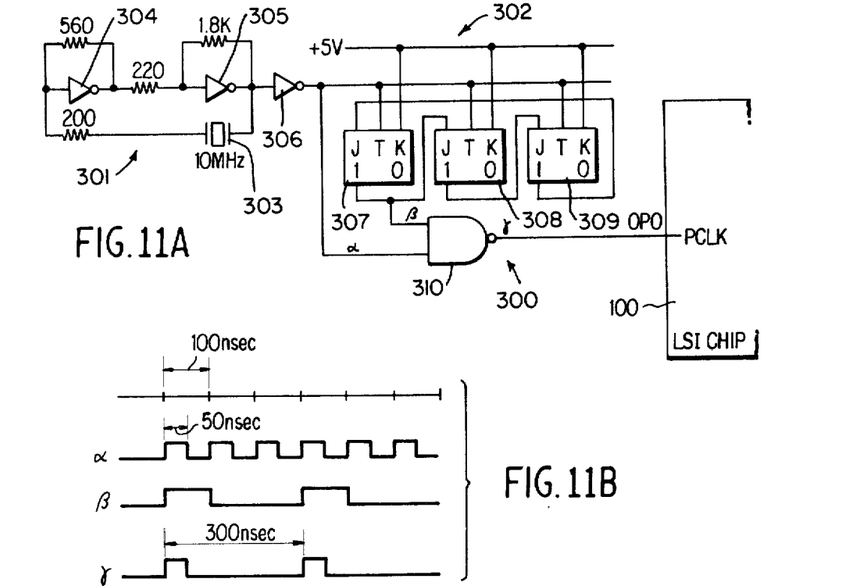
FIG. 11A shows a circuit diagram of the clock pulse generator shown in FIG. 1.
FIG. 11B shows a waveform diagram for the clock pulse generator shown in FIG. 11A.

A clock pulse generator 300 includes a quartz oscillator 301 with an oscillation frequency of 10MHz and a ternary counter 302. The oscillator 301 comprises a quartz crystal 303, inverters 304, 305 and 306, and resisitors as shown in FIG. 11A. The ternary counter 302 comprises J-K flip-flop circuits 307, 308, and 309, and a NAND gate 310. The oscillator 301 generates an α signal of pulse duration of 100 nsec. and the ternary counter 302 counts down the α signal to produce a β signal so that output signal γ of the clock pulse generator 300 is a pulse train of pulse width of 50 nsec. of pulse duration 300 nsec.

(9) Power Source for Logic Circuits, Initialize and Interrupt

Figure 12A:
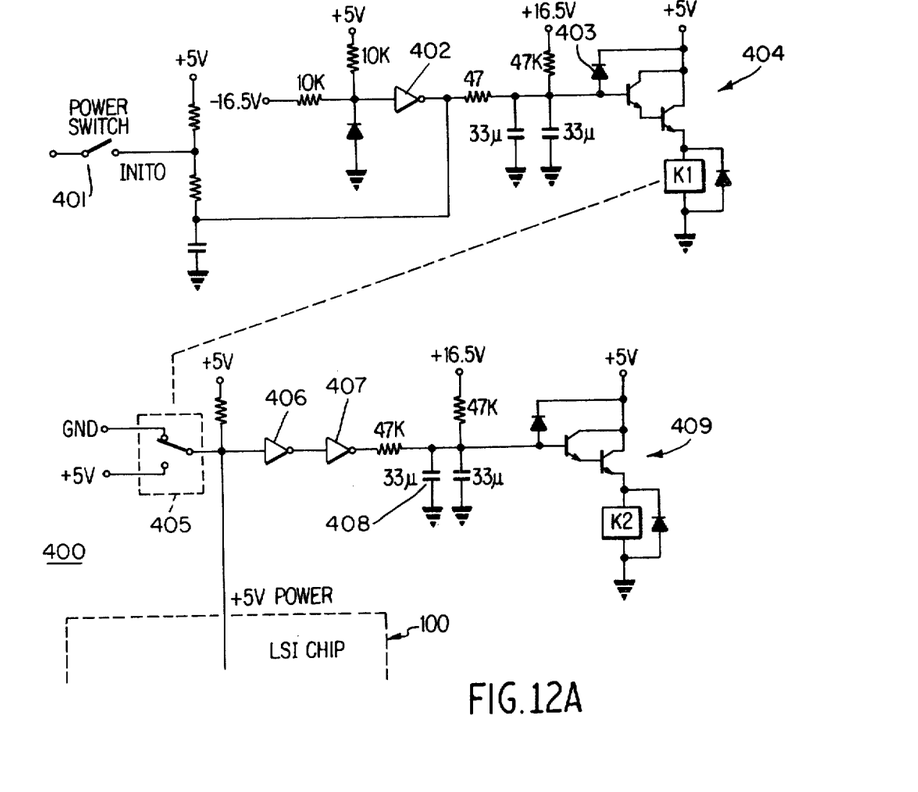
FIG. 12A shows a circuit diagram of the power source shown in FIG. 1.

The ACU 100 is energized by the power source supplying + 5V and the reference (ground) potential as shown in FIG. 12A.

The initialization of the ACU 100 is conducted at the energizing timing of + 5V from the power source in order to minimize the number of external terminals of the semiconductor chip. At the initialization of the ACU 100, the start address of the microinstruction "Initialize Routine" is read out from the AROM 126 to the RAR 123 and the microinstruction "No-Operation" is also read out from the BROM 127 to the RDR 124.

Figure 12B:
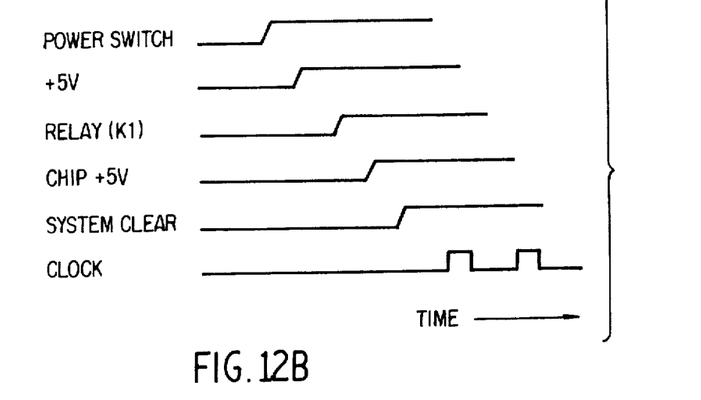
FIG. 12B shows a sequence diagram of the power source shown in FIG. 12A.

To establish these conditions, the following steps are sequentially undertaken as shown in FIG. 12B.

First, the power switch 401 of the console is turned on. The voltage at the output terminal of inverter 402 is changed so that the current, which flowed from the power source (+16.5V.) to the power source (+5V.) through the resistor (47K) and the diode 403 while the power switch 401 was off, now flows to the relay K1 through the base-emitter connection of the Darlington transistor circuit 404, and then circuit 404 and the relay K1 are turned on. Then + 5V is supplied to the relay K1. When the relay K1 is energized, its relay contact 405 transfers from the GND terminal to the +5V terminal so as to supply +5V to the ACU 100 therethrough.

After being supplied with + 5V as the logic power source the ACU 100 starts the operation described above. +5V is also supplied to the relay K2 through a delay circuit comprising the inverters 406 and 407, and the resistor-capacitor network 408, and the Darlington transistor circuit 409. The clock pulse generator 300 is energized by being supplied with +5V through the contact (not shown) of the relay K2. Then, the ACU 100 receives the clock pulse signals. The signal with +5V. supplied through the contact of the relay K2 is also used for the system clear signal (SCLRO) in the initialize and interrupt circuit 900. The circuit 900 generates the primary power failure signal (PPF) in the conventional manner.

4. Flow of Control

The flow of control in this data processing system is determined by the microprogram stored in the CROM. The flow of control comprises four phases as follows;

Phase 0 — Read cycle of macroinstruction from the main memory and classification of the macroinstruction.

Phase 1 — Calculation cycle of an operand address, an index-modification cycle thereof, and a fetch cycle of the operand from the index-modified address.

Phase 2 — Read cycle of a microinstruction train from the CROM 200 in response to a predetermined macroinstruction and execution of the microsteps.

Phase 3 — Interrupt handling cycle at the presence of events thereof.

The macroinstructions are classified as follows:

RR type — The macroinstructions include two operands to the GR.

RX type — The macroinstructions include an operand of the source for an address of the main memory and another operand of the destination for the GR.

RS type — The macroinstructions include an operand of the source for immediate data which are allowable to index-modify, and another operand of the source for the GR.

SF type — The macroinstructions include an operand of the source for one-byte immediate data and another operand of the destination for the GR.

Figure 13A:
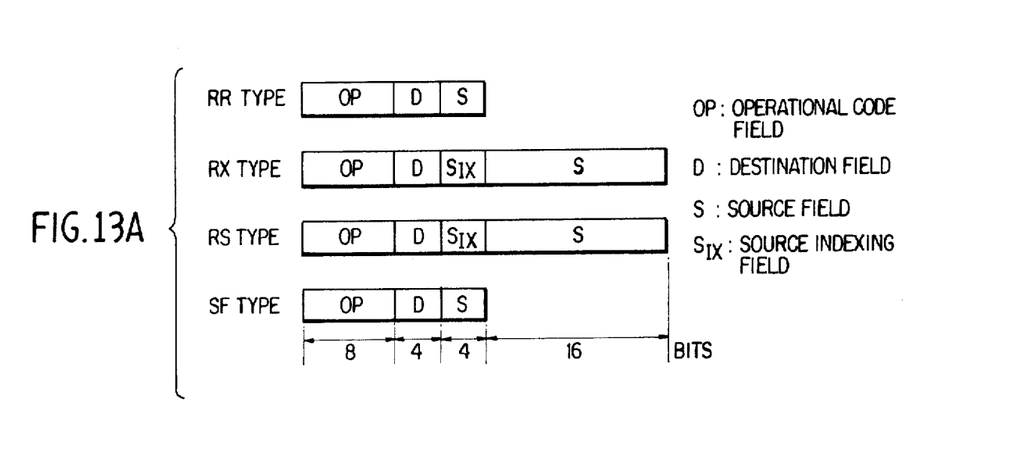
FIG. 13A shows macroinstruction formats.
Figure 13B:
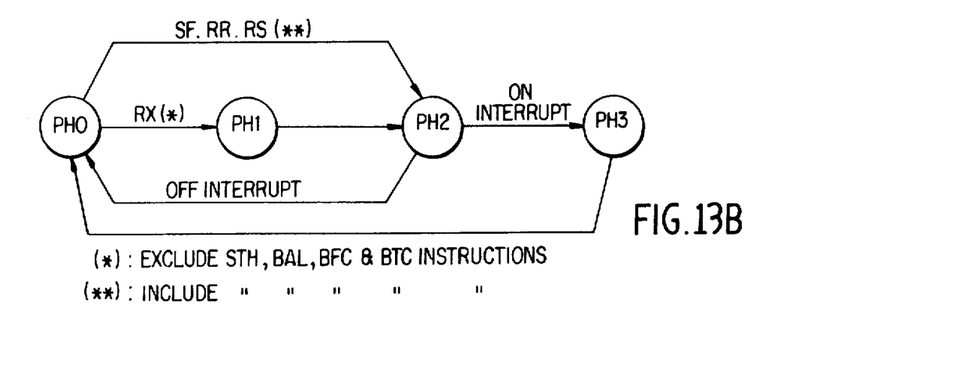
FIG. 13B shows a phase sequence diagram in accordance with the invention.

The classification of these macroinstruction and the transfer diagram between the phases are respectively shown in FIGS. 13A and 13B.

5. Microinstructions

Microinstructions stored in the control stage of the CROM 200 comprise one-word instructions and two-word instructions in which each one-word thereof contains 11 bits.

One instruction of the microinstructions is executed in parallel with the fetch of the next instruction. The executing timing is assigned to one step of the microprogram in a clock pulse.

(1) Control storage (CROM) allocation

Figure 14:
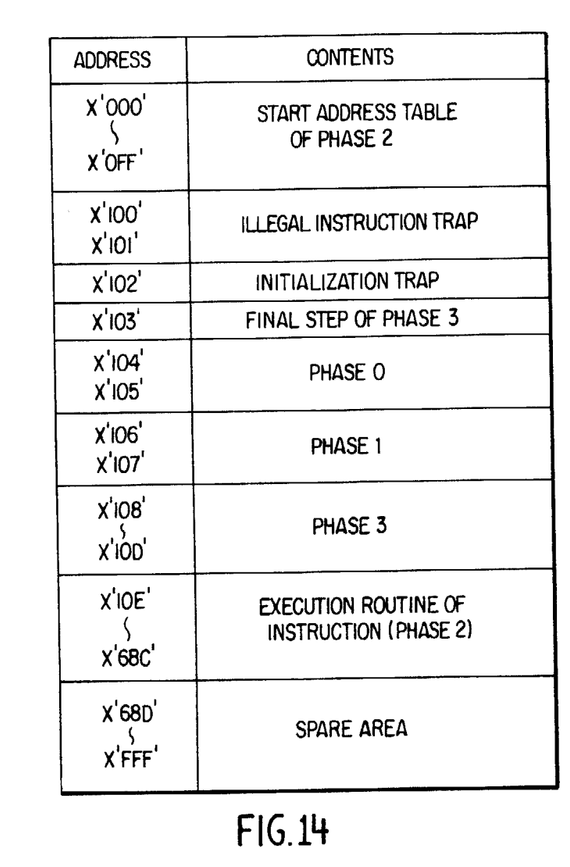
FIG. 14 illustrates a memory allocation diagram for the control stage shown in FIG. 1, FIGS. 15A–15D illustrate a flow diagram for execution of the microinstructions.

The contents of the microprograms stored in the CROM 200 are shown in FIG. 14.

The start addresses of phase 2 are stored from X '000' to X 'OFF'. When phase 0 or phase 1 is shifted to phase 2 in response to DECODE instructions, the contents of phase 2 are read out and entered into the RAR 123. In this case, machine instruction codes (upper 8-bits of IR) are used for the addresses. If the machine instructions are illegal, the contents designate the address of X'100' and the control is shifted to phase 3 from X'100' because the contents stored at the addresses of X'100' and X'101' comprise an illegal instruction trap.

At the power-on or initialized operation on the console, the RAR 123 in the ACU 100 receives an address of X'102'. The contents of the address of X'102' contain the branch instruction for the initialization routine. The contents of the addresses of X'104' and X'105' comprise a routine of phase 0. The contents of addresses of X'106' and X'107' comprise a routine of phase 1 which is accessed by the macroinstructions of the RX type except for Store Halfword (STH), Branch and Link (BAL), Branch on False Condition (BFC), and Branch on True Condition (BTC) as shown in FIG. 13B.

When the other macroinstructions, such as SF type, RR type, RS type and RX type of STH, BAL, BFC, and BTC are accessed, the control of phases is shifted from phase 0 to phase 2. However, when the interrupt occurs, it is shifted to phase 3 after the completion of phase 2. A routine for interrupt is stored in addresses from X'108' to X'10D'. After the step of X'10D' is finished, the control of the phase is returned to phase 1 through a final step stored at X'103'. Routines for execution of phase 2 and 3 are stored in addresses from X'10E' to X'68C'. The remaining area in the control storage 200 is a spare area.

It may be noted, as mentioned above, in connection with the microinstruction that the start addresses of specific microinstructions are stored in the AROM 126 and auxiliary microinstructions are also stored in the BROM 127.

(2) Flow of execution of microinstructions
(a) Flow without branch operation.

Figure 15A:
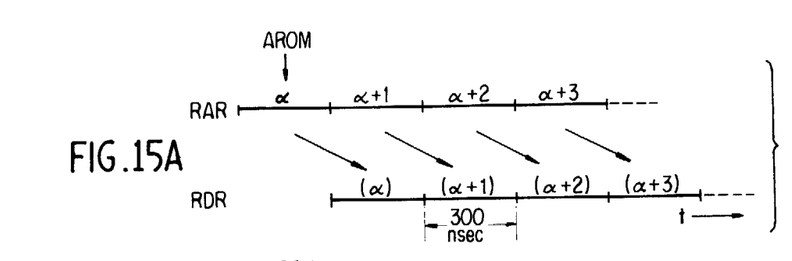

The contents of the RAR 123 are always supplied to the address input terminals of the CROM 200. After the lapse of the predetermined access time, for example 300nsec., information read out from the CROM 200 is stored at the RDR 124. Concurrently, the contents of the ARA 123 are added by one through ADD1 125 as shown in FIG. 2 which designates the next address of the microinstruction in response to the clock pulse. In the conventional flow of the execution of microinstructions without branch instructions, the RAR 123 stores the next address $\alpha + 1$ of the microinstruction to be executed and the RDR stores the current information ($\alpha$) of the microinstruction as shown in FIG. 15A.

(b) Flow with branch operation.

Figure 15B:
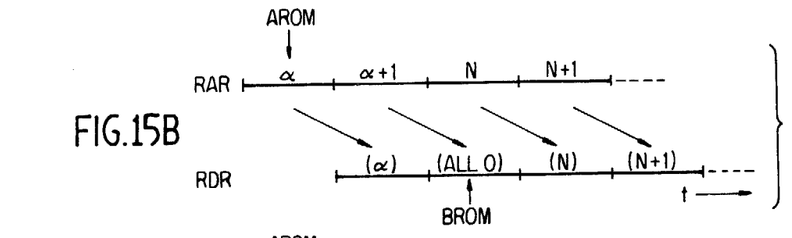

Two microsteps are required for branch instructions to be executed at acceptance of conditions as shown in FIG. 15B.

In this case, the auxiliary microinstruction "NO OPERATION" (= all zero) from the BROM 127 is inserted into the RDR 124 where N represents a jumping address and N for Jump on Privilege is X'100'.

Figure 15C:
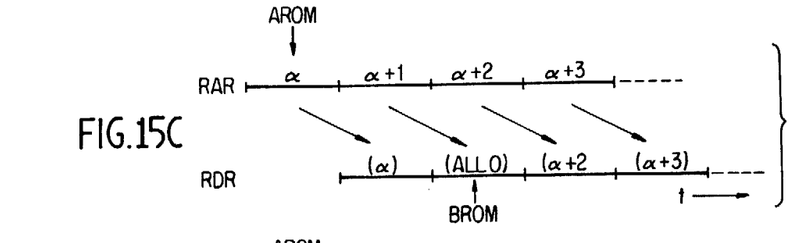
Figure 15D:
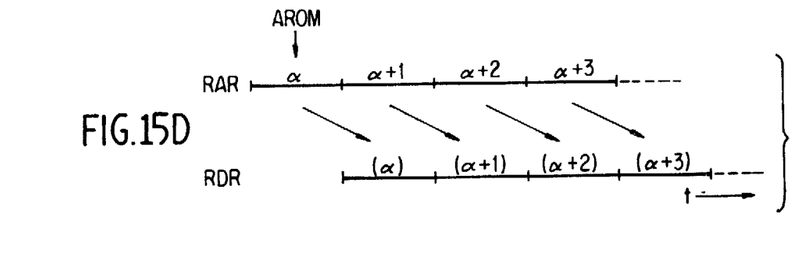

However, when the branch conditions are not accepted, two-word branch instructions (BRANCH and TEST) take the two microsteps as shown in FIG. 15C because one is added to the contents of RAR while the one-word branch instructions JUMP and Jump on Privilege) are the same as flow without the branch operation as shown in FIG. 15D.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In a minicomputer system, a control storage for storing microinstructions, main memory means for storing macroinstructions and data, and an arithmetic control unit integrated on a one-chip semiconductor device and connected to the control storage and the main memory means, said arithmetic control unit comprising:
   general registers designated by said macroinstructions and indirectly designated by said microinstructions,
   working registers utilized by said microinstructions,
   arithmetic and logic means for executing parallel add and subtract operations, logical operations, and shift operations in accordance with said microinstructions,
   microinstruction fetch control means connected to the control storage for storing a next microinstruction address and one of said microinstructions to be executed,
   a read only memory connected to the miroinstruction fetch control means and having a first means for storing addressed of specific microinstructions for phase control and for handling illegal instructions and initialization of said arithmetic control unit, and a second means for storing auxiliary instructions of said microinstructions,
   a control decoder connected to the microinstruction fetch control means for decoding said microinstructions to enable functional operations of said arithmetic control unit,
   macroinstruction fetch control means for storing a next macroinstruction address and one of said macroinstructions to be executed, status control means for storing machine control information, and an internal common bus connected to the general registers, working registers, arithmetic and logic means, microinstruction fetch control means, macroinstruction fetch control means and status control means for communication between units in said arithmetic control unit.

2. A minicomputer system according to claim 1 including buffer means for connecting said internal bus with external devices located outside of said one-chip semiconductor device.

3. A minicomputer system according to claim 1 wherein said arithmetic and logic means includes an A-register for an accumulator, a B-register used for an auxiliary register of said A-register and for an extend register with double precision, and logic operation means connected to the A-register, the B-register and the internal bus for operating on data supplied from said A-register or said B-register and data supplied from said internal bus, and wherein said status control means includes a condition code register for storing carry, overflow and sign flag information as a result of parallel add and subtract and logic operations of the arithmetic and logic means to provide said flag information for the next operation.

4. A minicomputer system according to claim 1 wherein said macroinstruction fetch control means includes a location counter connected to the internal bus for storing a next macroinstruction address, and an instruction register connected to the general registers, the working registers and the internal bus for holding one of said macroinstructions to be executed, said instruction register having an operation field, a source operand field and a destination operand field.

5. A minicomputer system according to claim 1 wherein said status control means includes a first register for storing information of masked interruptions, and a second register for holding carry, overflow, and sign flag information as a result of parallel add and subtract and logic operations of the arithmetic and logic means.

6. A minicomputer system according to claim 1 including means for reading signals of external interrupt events into said semiconductor device through said internal bus at the execution of a microinstruction for completing the execution cycle of interpretation of said microinstructions and means for handling said interrupt events before advancing the execution cycle of the next microinstruction.

7. A minicomputer system comprising:
(1) main memory means for storing macroinstructions and data,
(2) a control storage for storing microinstructions, and
(3) an arithmetic control unit integrated on a one-chip semiconductor device and connected to the control storage and the main memory means, the arithmetic control unit comprising:
 (a) an internal common bus for communication between units of said arithmetic control unit,
 (b) general registers connected to the internal bus and designated by said macroinstructions and indirectly designated by said microinstructions,
 (c) working registers connected to the internal bus and utilized by said microinstructions,
 (d) arithmetic and logic means connected to the internal bus for executing parallel add and subtract operations, logical operations, and shift operations controlled in accordance with said microinstructions comprising:
  (i) an accumulator register,
  (ii) an auxiliary and extend register for said accumulator register, and
  (iii) logic operation means connected to the accumulator register, the auxiliary and extend register and the internal bus for operating on data supplied from said accumulator register or said auxiliary register and supplied from said internal bus,
 (e) microinstruction fetch control means connected to the control storage for storing a next microinstruction address and one of said microinstructions to be executed,
 (f) a read only memory connected to the microinstruction fetch control means and having a first means for storing addresses of specific microinstructions for phase control and for handling illegal instructions and initialization of said arithmetic control unit, and a second means for storing auxiliary instructions of said microinstructions,
 (g) an internal control decoder connected to the microinstruction fetch control means for decoding said microinstructions to enable functional operations of said arithmetic control unit,
 (h) a location counter connected to the internal bus for storing a next macroinstruction address,
 (i) an instruction register connected to the general registers, the working registers and the internal bus for holding one of said macroinstructions to be executed, said instruction register having an operand portion, a source portion, and a destination field, and
 (j) status control means connected to the internal bus for storing machine control information,
(4) a clock pulse generator connected to the arithmetic control unit for providing said arithmetic control unit with clock pulse signals,
(5) a power source connected to the arithmetic control unit, and
(6) an external control decoder connected to said control storage for decoding said microinstructions from said control storage to control said main memory means.

8. A minicomputer system according to claim 7 wherein the internal bus is a bidirectional bus and including tri-state gates external to the arithmetic control unit and connected to the internal bus for controlling the flow of information to and from said internal bus.

9. A minicomputer system according to claim 7 wherein said microinstruction fetch control means includes an address register and a data register, said address register and said data register connected to said control storage, and wherein said auxiliary instructions include an instruction for imparting a result to a destination register in said general registers, an instruction for clearing the contents of said accumulator register, an instruction for loading the contents of a source register in said general registers in said accumulator register, an instruction for loading the masked contents of the predetermined field of said instruction register in said accumulator register, and an instruction for no-operation.

10. A minicomputer system according to claim 7 wherein said arithmetic control unit includes an output terminal for providing said external decoder with a signal to prevent said external decoder from decoding information containing said microinstructions and data supplied from said control storage when said information is only used for said arithmetic control unit.

* * * * *